United States Patent [19]
Yoneda et al.

[11] Patent Number: 5,155,694
[45] Date of Patent: Oct. 13, 1992

[54] APPARATUS FOR MEASURING GROOVE POSITIONS OF A WORKPIECE

[75] Inventors: Takao Yoneda, Nagoya; Norio Ohta, Okazaki; Hiroshi Nakano, Toyota; Hisashi Nakamura, Toyoake; Yasuyuki Sato, Nagoya, all of Japan

[73] Assignee: Toyoda Koki Kabushiki Kaisha, Kariya, Japan

[21] Appl. No.: 606,082

[22] Filed: Oct. 30, 1990

[30] Foreign Application Priority Data

| Oct. 30, 1989 | [JP] | Japan | 1-282491 |
| Oct. 30, 1989 | [JP] | Japan | 1-282492 |
| Oct. 30, 1989 | [JP] | Japan | 1-282493 |

[51] Int. Cl.⁵ .................... C06F 15/20; G01B 5/16
[52] U.S. Cl. .................... 364/559; 33/501.15; 33/554
[58] Field of Search .............. 33/501.8, 501.9, 501.15, 33/551, 554; 364/474.03, 474.06, 559, 579, 580

[56] References Cited

U.S. PATENT DOCUMENTS

| 3,942,254 | 3/1976 | Thompson et al. | 33/501.9 |
| 4,276,700 | 7/1981 | Tanno et al. | 33/501.9 |
| 4,337,580 | 7/1982 | Tanno et al. | 33/551 X |
| 4,488,359 | 12/1984 | Mission | 33/501.8 |

FOREIGN PATENT DOCUMENTS

| 0016721 | 10/1980 | European Pat. Off. |
| 0019075 | 11/1980 | European Pat. Off. |
| 0325688 | 8/1989 | European Pat. Off. |
| 61-112215 | 7/1986 | Japan |
| 63-47040 | 2/1988 | Japan |
| 63-237857 | 10/1988 | Japan |
| 2197479 | 5/1988 | United Kingdom |

*Primary Examiner*—Parshotam S. Lall
*Assistant Examiner*—Edward R. Cosimano
*Attorney, Agent, or Firm*—Oblon, Spivak, McClelland, Maier & Neustadt

[57] ABSTRACT

An apparatus for measuring groove positions of a workpiece includes a sensor for detecting grooves formed on the workpiece and a position sensor for detecting angular position of the workpiece with respect to a predetermined standard position, a measuring cycle memory means for storing several predetermined measuring cycles, a data input means for imputting and storing groove data indicating groove shape, a measuring control means for selecting a specific measurement cycle from the measurement cycle memory means based on the groove data to execute selected measurement cycle, a calculation processing means for executing calculation processing for determining the center positions of grooves, and a data output means for outputting and displaying the results of the calculations in order to inform an operator of the center positions of the grooves.

12 Claims, 16 Drawing Sheets

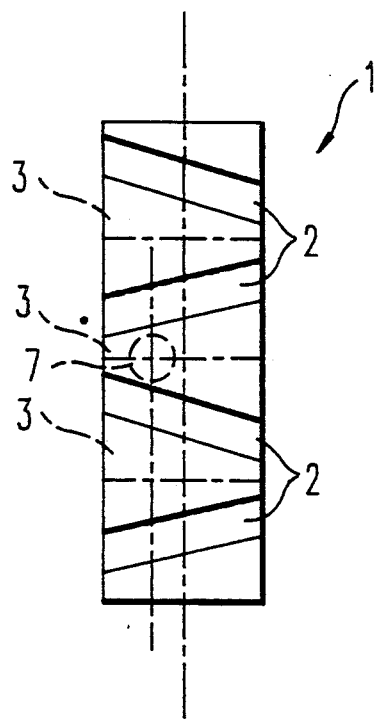
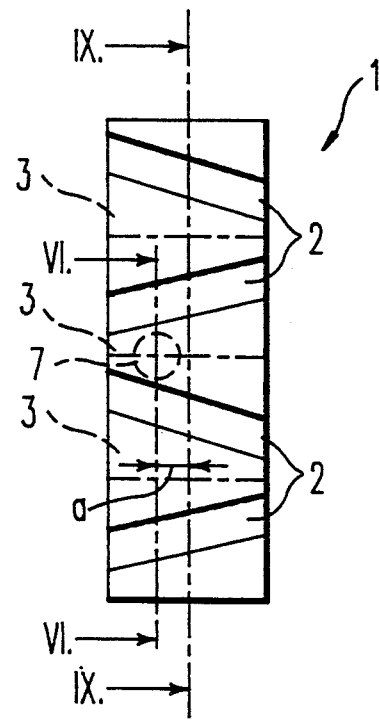
FIG. 3  FIG. 8
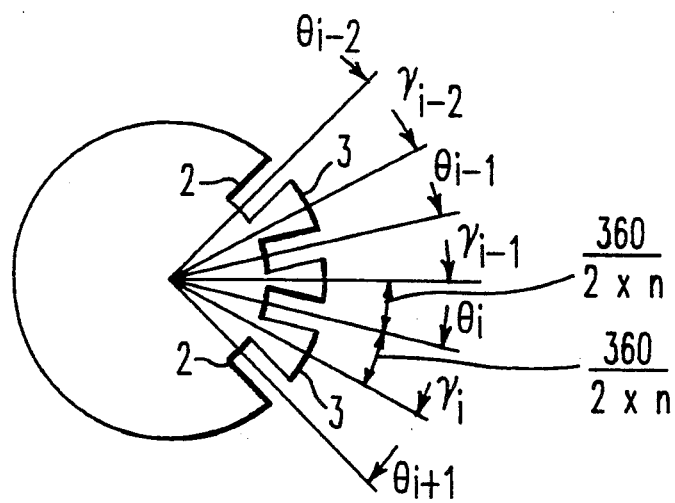
FIG. 9

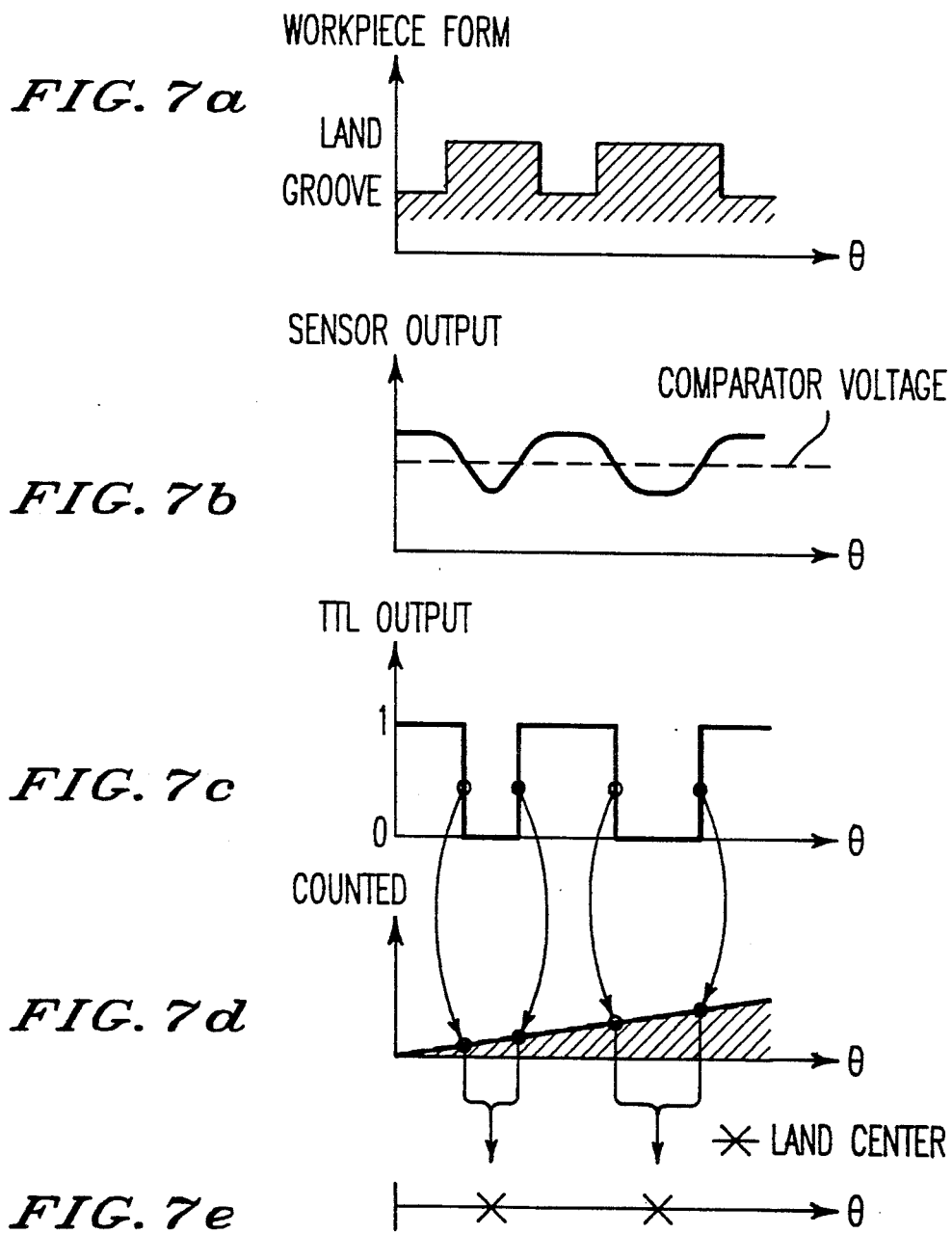

| GROOVE CENTER POSITION | $\theta_1$ | $\theta_2$ | $\theta_3$ | $\theta_4$ | $\theta_5$ | $\theta_6$ | $\theta_7$ | $\theta_8$ | $\theta_9$ | $\theta_{10}$ | $\theta_{11}$ | $\theta_{12}$ |
|---|---|---|---|---|---|---|---|---|---|---|---|---|
| MEASURED DATA (ANGLE) | 20 | 51 | 83 | 115 | 146 | 177 | 206 | 233 | 258 | 284 | 315 | 348 |
| SET DATA (ANGLE) | 20 | 50 | 80 | 110 | 140 | 170 | 200 | 230 | 260 | 290 | 320 | 350 |
| DEVIATION BETWEEN CENTER POSITIONS (PITCH ERROR) | 0 | +1 | +3 | +5 | +6 | +7 | +5 | +3 | −2 | −6 | −5 | −2 |

FIG. 17b

| GROOVE CENTER POSITION | $\theta_1$ | $\theta_2$ | $\theta_3$ | $\theta_4$ | $\theta_5$ | $\theta_6$ | $\theta_7$ | $\theta_8$ | $\theta_9$ | $\theta_{10}$ | $\theta_{11}$ | $\theta_{12}$ |
|---|---|---|---|---|---|---|---|---|---|---|---|---|
| MEASURED DATA (ANGLE) | 20 | 51 | 83 | 115 | 146 | 177 | 206 | 233 | 258 | 284 | 315 | 348 |
| CENTER POSITION (ANGLE) CALCULATED IN ACCORDANCE WITH $\theta_1 + \bar{\epsilon}$ | 21.25 | 51.25 | 81.25 | 111.25 | 141.25 | 171.25 | 201.25 | 231.25 | 261.25 | 291.25 | 321.25 | 351.25 |
| DEVIATION BETWEEN CENTER POSITIONS (PITCH ERROR) | −1.25 | −0.25 | +1.75 | +3.75 | +4.75 | +5.75 | +3.75 | +1.75 | −3.25 | −1.25 | −1.25 | −1.25 |

FIG. 17c

APPARATUS FOR MEASURING GROOVE POSITIONS OF A WORKPIECE

BACKGROUND OF THE INVENTION

The present invention relates to a general-purpose measuring apparatus for measuring grooves positions of a workpiece which is capable of measuring grooves on a workpiece such as twisted grooves, equal split grooves and unequal split grooves, and determining the center positions of said grooves, and determining the twist directions of grooves having twist angles in alternatingly reverse directions.

Determination of the center positions of a grooves formed at the outer surface of a workpiece is required to machine such grooves by grinding, chamfering and the like. Usually, such determination is accomplished by an operator based on dimensions shown in drawings. If such determining operation can be automated, the groove measuring time can be shortened and production cost can be decreased by reducing the number of personnel required. Thus, development of an apparatus capable of automatically measuring such grooves is desirable. If an apparatus is developed which is applicable to a variety of grooves, such as a twisted groove, equal split groove, unequal split groove and many others, it is expected that the efficiency of the measuring operation will be greatly improved.

To grind twisted grooves formed at the outer surface of a cylindrical workpiece, such as an inner race of constant velocity joint, the positions of twisted grooves are required to be detected accurately by measurement, so that the twisted grooves are indexed to a location corresponding to the position of a grinding wheel.

However, in cases where each of twisted grooves has the same twist angle, but their twist direction change alternatively, it is difficult to measure their positions accurately, as is explained hereinafter.

Conventionally, the center positions of twisted grooves of a workpiece supported on a grinding machine are measured using a sensor which is disposed in a plane perpendicularly intersecting the rotational axis of the workpiece and corresponding to the longitudinal center of grooves.

However, actually it is very difficult to set the detecting center of the sensor in the place corresponding to the longitudinal center of twisted grooves, and there can be produced some dislocations.

For example, as shown in FIG. 12, assuming that the erroneous dislocation between the detecting center of sensor 7 and the plane corresponding to the longitudinal center of workpiece 1 is a, and the twist angle of twisted grooves is $\alpha$, the dislocation $\delta$ represented by a $\cdot \tan \alpha$ occurs in the circumferential direction of the workpiece 1 as an error. To eliminate said dislocation $\delta$, the sensor 7 is required to be set at higher accuracy in the plane perpendicular to the rotational axis, and is therefore required to be set by skilled workers. This was an obstacle to automatize the preparing operation for measurement.

When finishing grinding, chamfering machining or the like is carried out for each of the grooves formed at the outer periphery of a workpiece, it is usual that such machining is performed in order of the groove arrangement starting from a certain groove of the workpiece. Consequently it is required to index each groove exactly from a predetermined reference position. For this purpose, in automatic grinders or the like, angular position of the center of each groove with respect to the reference position indicated on the manufacturing drawing is previously inputted as set data, and in accordance with the set data each groove is automatically indexed, then the grinding or the like is carried out.

However, when the center positions of the grooves are indexed in accordance with the set data for grinding operation, as mentioned in the above description, the grinding allowance to both sides of the groove is different in each groove because of pitch errors among the center positions of the grooves formed on the workpiece. As a result, there is a problem that the different grinding resistances acting on both the sides of the grinding wheel exert a bad effect upon the grinding accuracy, or shorten the life of the grinding wheel.

Further, when the measurement of the groove positions is carried out by operators as described above, the efficiency of the machining operation is low because it takes long time for the measurement. In addition, when a plurality of grooves and lands are alternately formed with a regularly periodic pattern on the outer periphery of the workpiece, it is not necessary to measure those positions of all grooves on the workpiece, because it is possible to derive the positions of all grooves by measuring part of the grooves with said periodic pattern.

SUMMARY OF THE INVENTION

A primary object of the present invention is to provide a general-purpose measuring apparatus for measuring groove positions of a workpiece, which is capable of automatically measuring grooves on a workpiece such as spiral grooves, equal split grooves and unequal split grooves, and determining the center positions of said grooves.

Another object of the present invention is to provide an apparatus for measuring groove positions of a workpiece capable of measuring twisted grooves having an equal twist angle, but changing twist direction alternatively so as to detect center positions of the twisted grooves.

A further object of the present invention is to provide an apparatus for measuring groove positions of a workpiece which is capable of measuring center positions of a plurality of grooves and determining indexing positions for the grooves which can reduce deviations in grinding allowances at the plurality of grooves.

A still further object of the present invention is to provide an apparatus capable of measuring center positions of grooves formed with a regularly periodic pattern on the workpiece, by measuring a minimum number of grooves, thereby reducing measuring time.

The primary object of the present invention is accomplished by providing an apparatus for measuring groove positions of a workpiece, said apparatus comprising, a sensor 7 for detecting a surface portion of a workpiece and, a position sensor for detecting the position of the workpiece with respect to reference position, a measuring cycle memory means for storing several predetermined measuring cycles, a data input means for inputting and storing groove data indicating groove shape pattern such as twisted groove, equal split groove and unequal split groove, a measuring control means for selecting a specific measurement cycle from the measuring cycle memory means based on the groove data so as to execute a selected cycle, a calculation processing means for executing calculation processing for determining, center positions of the grooves, and a data output means for outputting and displaying the results of the calculations.

First, groove data is inputted to select a groove shape pattern such as twisted groove, equal split groove, unequal split groove and the like. The measuring control means selects a specific measuring cycle stored in measuring cycle memory means based on the groove data, then executes said specific measuring cycle. The grooves are detected by the sensor during the measuring cycle, and the output of the position sensor is inputted as measurement data describing the groove position relative to the reference position of the workpiece. The calculation processing means executes calculation processing for determining center positions of the grooves, and the calculation results are displayed and output by means of the data output means.

With this configuration a measuring cycle suitable for groove shape pattern is automatically selected to determine their center positions.

In another aspect, a calculation means is provided for computing center positions of lands between adjoining twisted grooves having an equal twist angle and opposite twist directions. The center position of the twisted grooves are then calculated based on the center positions of the lands.

Further, the apparatus according to the present invention is provided with a measured data memory means for memorizing calculated values indicating measured center positions as measured data, a set data memory means for memorizing set values indicating theoritical center positions of each groove previously inputted as a set data, a comparing means for accumulating each deviation between the measured data and the corresponded set data of the center position of each groove and a center position calculating means for calculating the center position of each groove using the mean value of the deviation derived from dividing said accumulated deviations by the number of the grooves. With this arrangement, it is possible to calculate center positions which can reduce deviations in machining allowances of the grooves if the grooves are indexed using the calculated center positions during machining operations. Furthermore, the apparatus according to the present invention is provided with a groove positions indexing means for finding the center positions of all grooves using measured center positions of a minimum number of grooves. With this configuration, the measuring time can be shortened.

Other and further objects, features and advantages of the invention will appear more fully from the following description.

BRIEF DESCRIPTION OF THE DRAWINGS

The objects and features of the invention may be understood with reference to the following detailed description of illustrative embodiments of the invention, taken together with the accompanying drawings in which:

FIG. 2, comprising

FIG. 3 is an elevation view of a workpiece with grooves having twist angles in alternatingly reverse directions.

FIG. 7, comprising FIGS. 7(a), 7(b), 7(c), 7(d), and 7(e), is a timing chart of the apparatus of FIG. 6.

FIG. 8 is an elevational view of said workpiece.

FIG. 9 is a cross sectional view to IX—IX line of said workpiece.

FIGS. 17(a)-17(c) are diagrams showing concrete examples of process for calculating the center position of each groove, and more particularly FIG. 17(a) is a diagram showing the center position of the groove and FIGS. 17(b) and 17(c) are tables of data.

DESCRIPTION OF THE PREFERRED EMBODIMENTS

Figure 1:
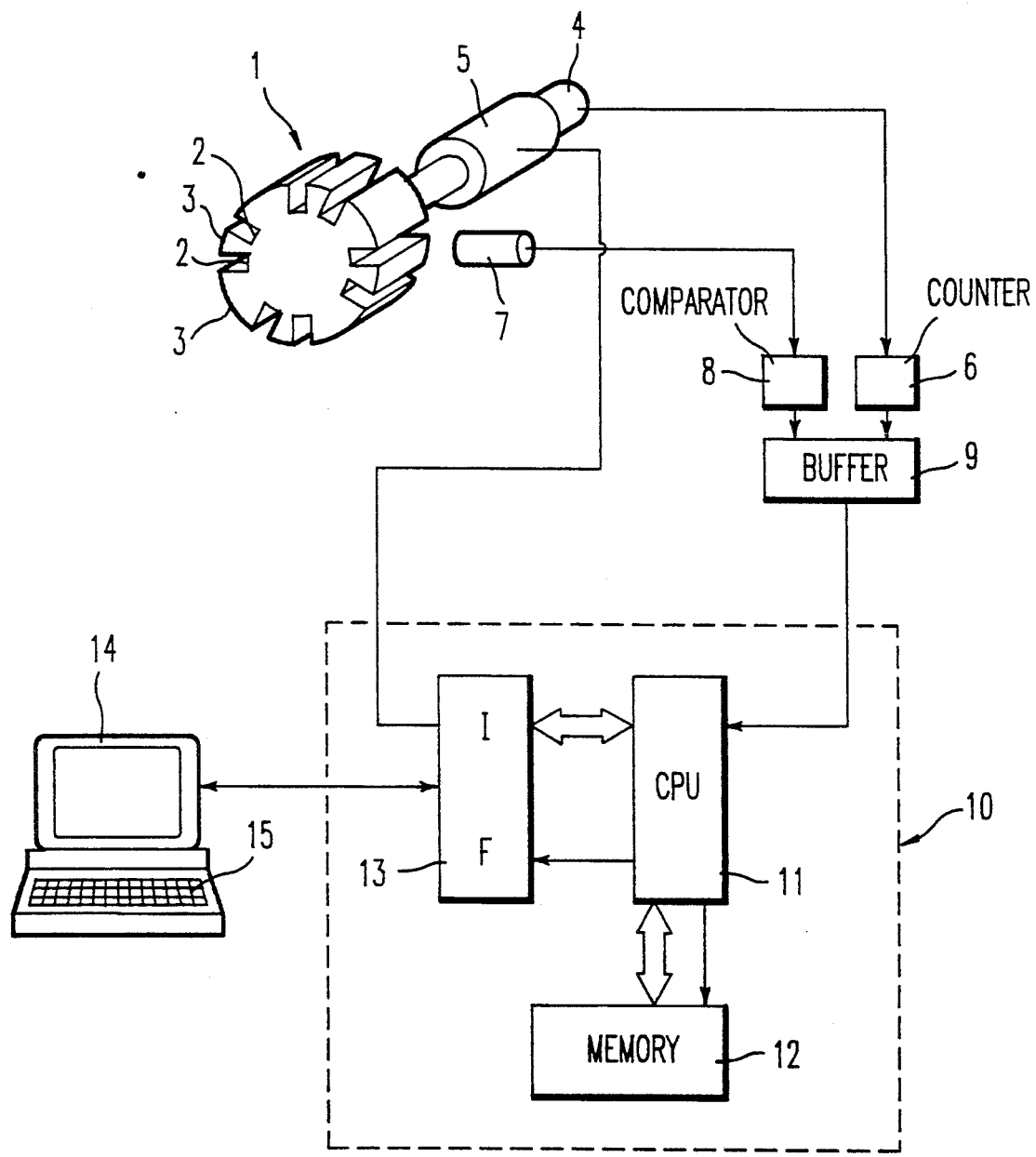
FIG. 1 is a brief block diagram showing a measuring apparatus according to a first embodiment of the present invention.
Figure 2A:
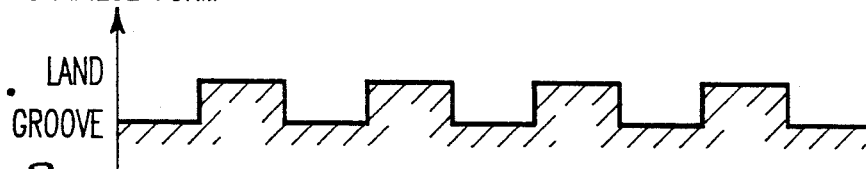
FIGS. 2(a), 2(b), 2(c), 2(d), and 2(e), is a timing chart showing the fundamental principles of the measuring process.
Figure 2B:
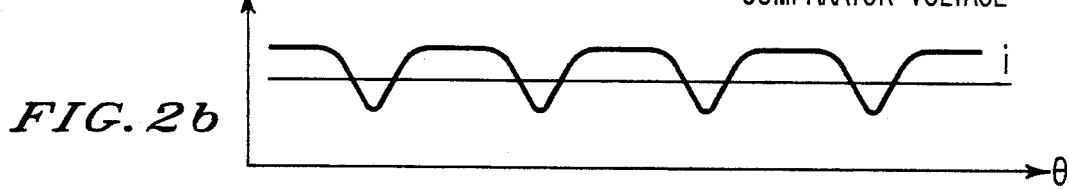
Figure 2C:
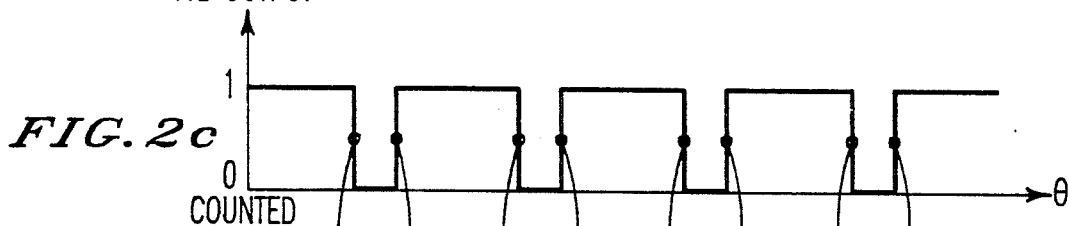
Figure 2D:
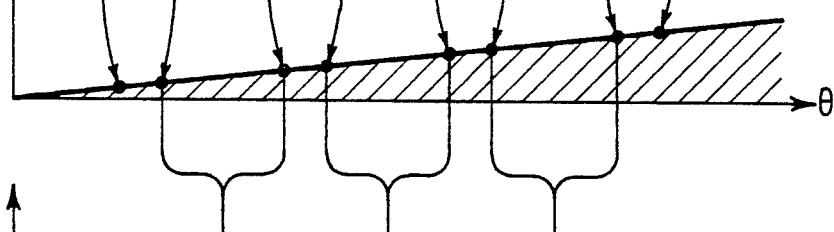
Figure 2E:
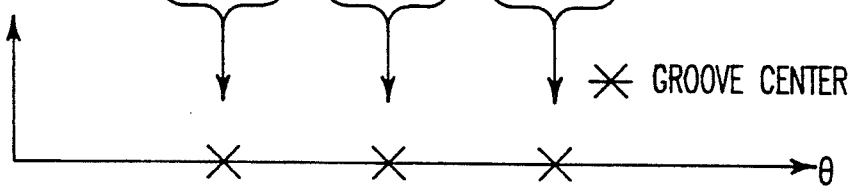

Referring to FIG. 1, there is shown an outlined block diagram of a measuring apparatus according to the first embodiment.

A workpiece 1 is formed with grooves 2 and lands 3 by turns on the circumference, and supported so that it can be rotated about the rotational axis of the workpiece 1. A rotary encoder 4 of a position sensor, which is directly connected to a motor 5 for rotating the workpiece 1, outputs the pulses to a counter 6. The rotary encoder 4 makes one rotation at every rotation of the workpiece 1. In order to detect the existence of the grooves 2 on the workpiece 1, a non-contact sensor 7, such as eddy current potentiometer is used, is arranged to make its center axis intersect perpendicularly to rotational axis of the workpiece 1. The non-contact sensor 7 can detect the existence of the grooves 2 by changing the output voltage when it faces the groove portion of the workpiece 1 or when it does the land portion of that, and the analog output is inputted into a comparator 8. In the comparator 8, the analog output of the non-contact sensor 7 is converted to binary value [1], [0] in TTL level by comparing the analog output with a constant comparator voltage. The buffer 9 reads out and stores the accumulated counted value outputted from the counter 6 every time when the binary signal changes from [0] to [1] and from [1] to [0] so as to output the counted value to a calculation processing unit 10. The calculation processing unit 10 is constituted of a CPU 11, a memory 12 and an interface 13, through which the CPU 11 is connected to a personal computer (microcomputer) 14, so that the various operating instruction, data and like are inputted by means of the keyboard 15 of personal computer 14, and measurement values and the like are displayed on the cathode ray tube (CRT) of personal computer 14. Memory 12 comprises read-only memory and a writable memory, and stores the data processing programs and programs for executing measurement cycles described later, and also stores the groove data inputted by keyboard 15 of personal computer 14. Actuation instruction signals for motor 5 which rotates the workpiece 1 are output from the CPU 11 through the interface 13.

FIG. 2 is a timing chart showing the basic principle for detecting the center positions of the grooves 2 during the operation of the above apparatus. First, when the non-contact sensor 7 successively corresponds to the grooves 2 and the lands 3 formed on the circumference of the workpiece 1, the output voltage of the sensor 7 changes as shown in FIG. 2(b) when detecting the actual surface positions of lands and grooves shown in FIG. 2(a). The voltage is binalized using the comparator voltage. The binalized output of the comparator 8 presents a rectangular wave in TTL level as shown in FIG. 2(c). Then the accumulated counted value in the counter 6, as shown in FIG. 2(d), is read out when the binalized output changes from [0] to [1] and from [1] to [0]. The counter values which are read in accordance with the above timing is used in the calculation processing unit 10, and the absolute data of the center positions of the grooves are outputted as angular information as shown in FIG. 2(e).

The angular position of each center is obtained by calculating average value of two counted values at the times when the binalized value changes to [1] and changes to [0], respectively.

FIG. 3 shows a workpiece 1 having grooves 2 and lands 3. Position of sensor 7 indicates that the sensor is offset from the center of the workpiece. When determining the twist directions of grooves having twist angles in alternatingly reverse directions, the previously mentioned noncontact sensor is disposed at a position displaced from the center in the width direction of workpiece 1. The workpiece 1 is rotated in one direction, and the land width is measured and the value is compared to a specified set value so as to determine whether the twisted groove is in the rightward direction or leftward direction.

The operation of the apparatus of the present embodiment is described hereinafter with reference to the flow charts shown in FIGS. 4 and 5.

Figure 4:
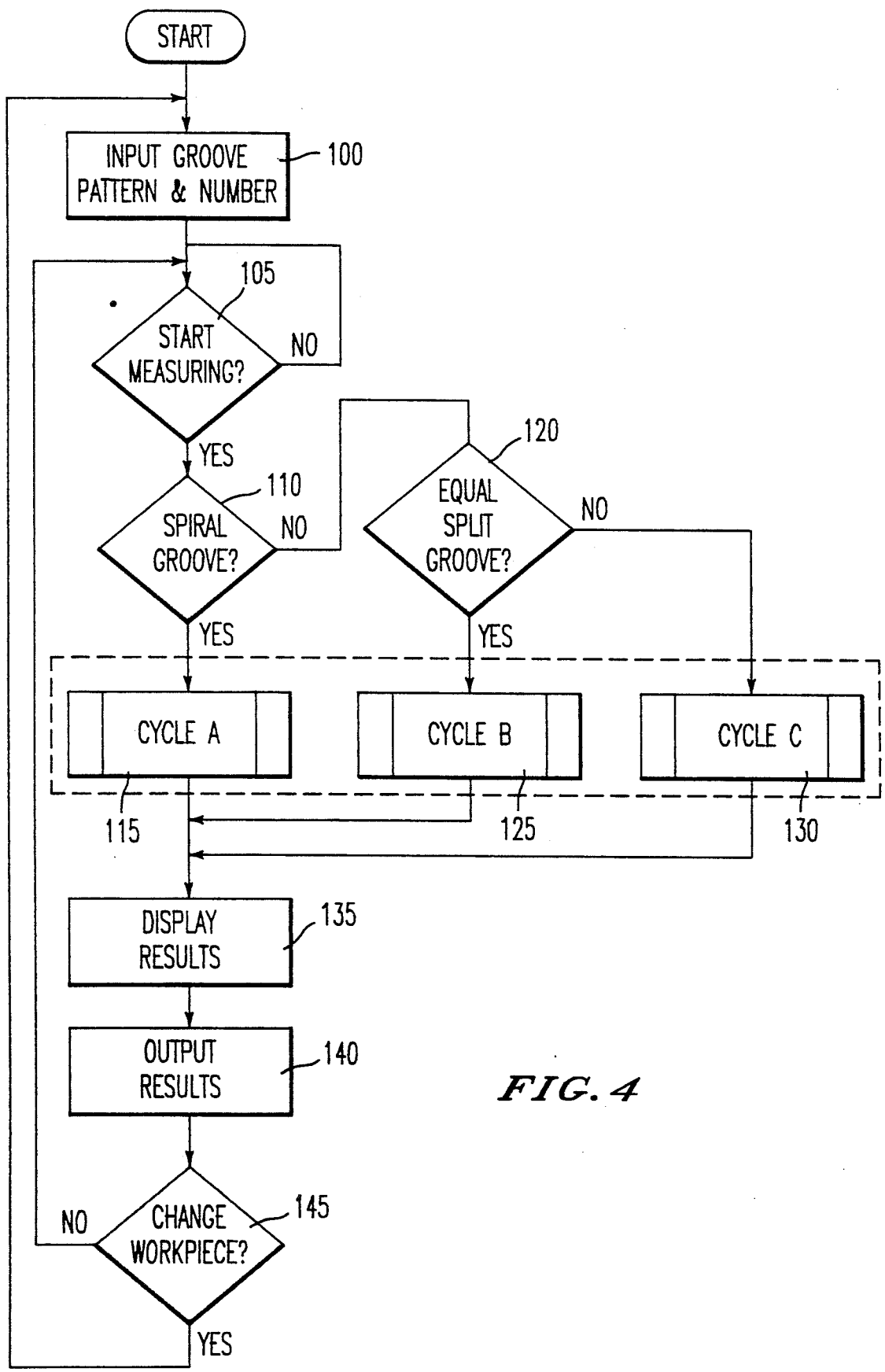
FIG. 4 is a flow chart showing the entire measuring process.

The flow chart in FIG. 4 shows the entire measuring process.

First, in step 100, groove data indicating groove shape pattern and groove number "N" are input through keyboard 15 of personal computer 14, and stored in memory 12 of calculation processing unit 10. Twisted groove, equal split groove, unequal split groove and the like are the groove shape patterns. When a determination is made to start measuring in step 105, the groove shape patterns are determined in steps 110 and 120, and if the groove shape pattern is a twisted groove the routine continues to step 115 where measuring cycle "A" is selected, or if the groove shape pattern is an equal split groove the routine continues to step 125 where measuring cycle "B" is selected, or if the groove shape pattern is an unequal split groove the routine continues to step 130 where measuring cycle "C" is selected. Measuring cycles "A", "B" and "C" are described later. Next, in steps 135 and 140, the measurement results are displayed on the CRT of personal computer 14, and the measuring results are output to a printer (not shown). In step 145, a determination is made as to whether or not the workpiece has been changed, and if it has not been changed the routine executes the measuring processing of steps 105 and subsequent steps, whereas if said workpiece has been changed, new workpiece data indicating groove shape patterns and groove number and like groove data are input and the aforesaid measuring process is executed.

Figure 5:
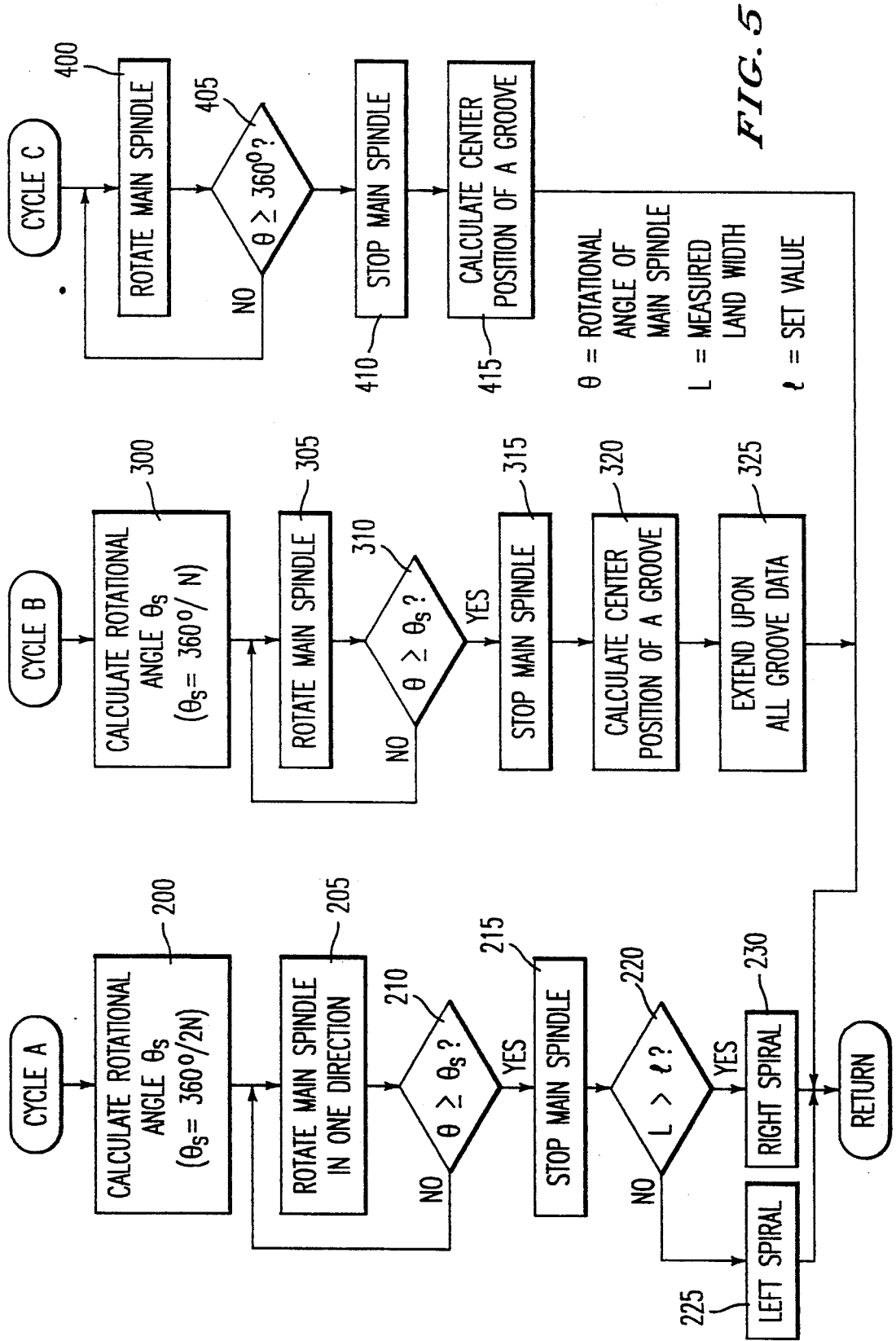
FIG. 5 is a flow chart showing the measuring cycles.

FIG. 5 is a flow chart showing the contents of the subroutines for measuring cycles "A", "B" and "C".

Measuring cycle "A" discriminates the twist direction of grooves having twist angles in alternatingly reverse directions.

First, in step 200, the minimum angle of rotation $\phi_s$ is calculated for the main measuring spindle required to discriminate the twist direction of one groove. $\phi_s = 360°/2N$ (where N is the number of right twisted grooves or left twisted grooves). In steps 205, 210 and 215, the main measuring spindle is rotated in one direction, and the main measuring spindle is stopped when the angle of rotation $\phi$ reaches $\phi \geq \phi_s$. In step 220, the land width "L" is measured at a position displaced from the center in the width direction of the workpiece according to the previously described measuring principles, and the measured value is compared to a set value l to discriminate whether the groove twist direction is right or left which is recorded in steps 225 and 230, respectively, then the routine returns to the main routine.

Measuring cycle "B" is used for equal split grooves and. In this case, the center position from a specific position of a single groove, with respect to a reference position is measured. After the measurement of the single groove, the measurement result is extended to the entire grooves. This shorten the measuring time.

In step 300, the minimum angle of rotation $\phi_s$ is determined for the main measuring spindle required measurement of one equal split groove by means of the equation $\phi_s = 360°/2N$. In step 305, 310 and 315, the main measuring spindle is rotated in one direction, and the main measuring spindle is stopped when the angle of rotation $\phi$ reaches $\phi \geq \phi_s$. In step 320, the center position of the measured groove is calculated, and thereafter in step 325 extends the measured result to the entire grooves, and returns to the main routine. The measuring result is extended to the entire grooves by adding $(360°/N) \cdot M$ (where N is the number of grooves and M is an integral number changing from 1 to N−1) to the measured center position.

Measuring cycle "C" determines the groove center position of unegual split grooves from specific reference positions.

In steps 400, 405 and 410, the main measuring spindle is rotated until the rotational angle $\phi$ exceeds 360°, then the main measuring spindle is stopped. In step 415, the center position of each groove is calculated by the previously described principles for measuring the groove center position, then the routine returns to the main routine.

Measuring cycles are not limited only to the previously described measuring cycles "A", "B" and "C" and other measuring cycles may be used.

According to the previously described measuring cycles, in the case that, grooves having twist angles in alternatingly reverse directions is measured, the twist direction is automatically discriminated, and, in the case that the measuring cycle for equal split grooves is executed, the measuring time can be shortened. Further, in case of the unequal split grooves, the center positions of unequal split grooves can be automatically calculated. Accordingly, by combining the apparatus of the present embodiment with a numerical control apparatus for accomplishing grinding processes and chamfering processes, and connecting both through an interface, it is possible to realize an integrated control of the numerical control apparatus, so as to accomplish an automated continuous process from the measurement of the workpiece groove to the actual machining.

The apparatus of the present invention having the previously described construction is capable of executing groove measurement suitable for grooves to be measured by selecting a specific measurement cycle and executing calculation processing for determining the positions of grooves and displaying and outputting the calculation results. Therefore, the apparatus is capable of automated execution of groove measuring process corresponding to a variety of groove shape patterns, and improves the efficiency of the measuring operation.

SECOND EMBODIMENT

Figure 6:
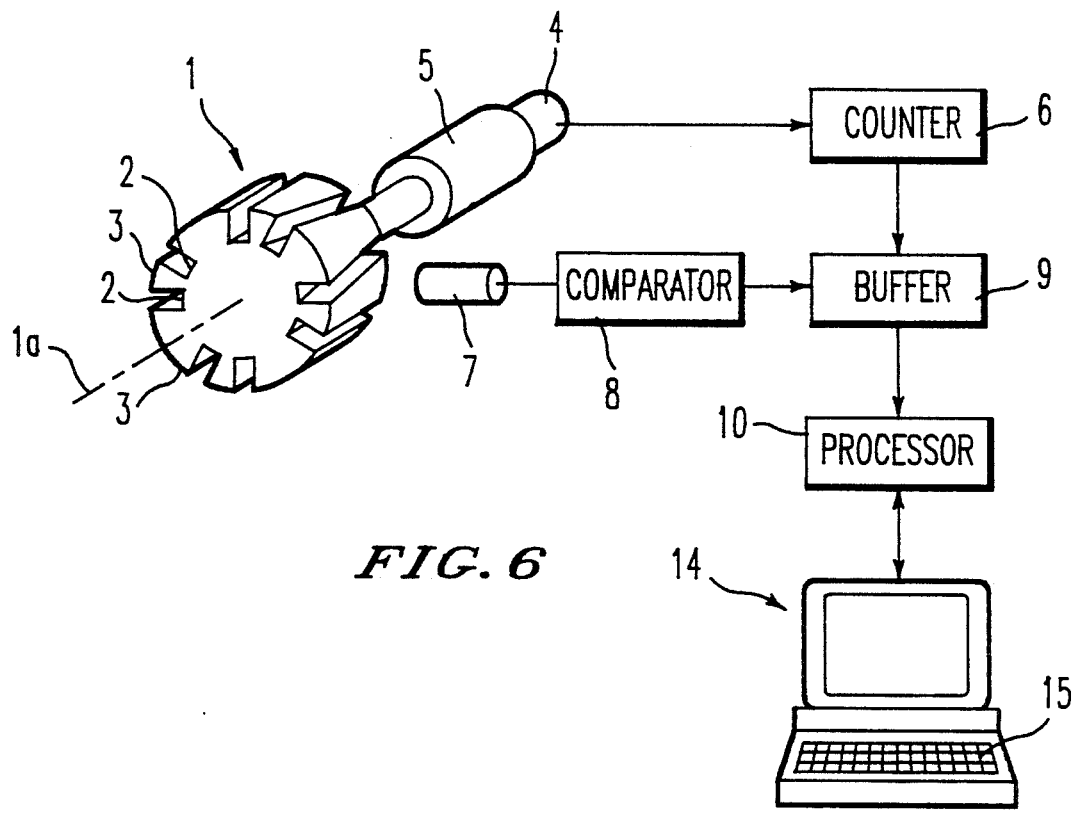
FIG. 6 is a schematic block diagram of a measuring apparatus according to a second embodiment of the invention.

At first, FIG. 6 shows the schematic block diagram of a measuring apparatus according to the second embodiment of the invention.

On a circumferential surface of workpiece 1 having cylindrical central axis 1a, there are formed twisted grooves 2 having an equal twist angle but changing the twist direction alternatively. Lands 3 are formed in between adjoining twisted grooves 2 and 2.

Since the construction of the measuring apparatus is the same as that in the first embodiment except for the processing of the calculation processing unit 10, only the processing of the calculation processing unit 10 will be described hereinafter.

FIG. 7 shows a timing chart representing a basic detecting principle of center positions of lands 3. With the non-contact sensor 7 sequently corresponding to twisted grooves 2 and lands 3 formed in the circumference of workpiece 1, its output voltage varies as shown in FIG. 7(b), when sensing the corresponding land and groove positions shown in FIG. 7(a), and the output of comparator 8 becomes a rectangular wave of TTL level (FIG. 7(c)). The changing timings of the rectangular wave from [0] to [1] and from [1] to [0] are used as a trigger signal for sampling counted value of counter 6 (FIG. 7(d)). With the means values of counted values read in said timings, the center positions of lands 3 are outputted as the angle information (FIG. 7(e)).

Next, FIG. 8 shows an elevational view of the workpiece, and FIG. 9 is a cross sectional view taken on line IX—IX of FIG. 8.

As shown in FIG. 6 and FIG. 8, on the circumferential surface of the workpiece 1 twisted grooves 2 having an equal twist angle and an inverse direction to adjoining twisted grooves, that is, twisted grooves 2 twisting to right hand and the same number of twisted grooves 2 twisting to left hand are formed alternately on the whole circumference, and its total number of twisted grooves 2 on the whole circumference is even number. As shown in FIG. 9, at the center of longitudinal direction of the workpiece 1 the pitch angle $(\theta_i - \theta_{i-1})$, $(\theta_{i+1} - \theta_i)$ ... of center positions $\theta_{i-1}, \theta_i, \theta_{i+1}$ ... of adjoining twisted grooves 2 are made to be equal.

Said pitch angles are represented as 360°/n, assuming n is the number of twisted grooves 2. Also as shown in FIG. 8, the non-contact sensor 7 is located to the position aparting from the center of longitudinal direction of workpiece 1 with a dislocation a.

As shown in FIG. 8 though the center positions of twisted grooves 2 vary gradually along the longitudinal direction of the workpiece 1, the centers of land 3 are constant at any position of longitudinal direction of the workpiece 1, because the angle of twist is equal and the direction of twist is inverse in twisted grooves 2 in the both sides of said land 3. As shown in FIG. 9, the center positions of lands 3 are represented as $\gamma_{i-2}, \gamma_{i-1}, \gamma_i$ ..., and these values of $\gamma_{i-2}, \gamma_{i-1}, \gamma_i$ ... are constant at any section rectangular to the axis.

As shown in FIG. 9, the pitch angles, $(\theta_i - \theta_{i-1})$, $(\theta_{i+1} - \theta_i)$ ... of center positions of twisted grooves 2 at the sections rectangular to the axis are 360°/n and constant, and also the pitch angles, $(\gamma_{i-1} - \gamma_{i-2})$, $(\gamma_i - \gamma_{i-1})$ ... of center positions of lands 3 are 360°/n and constant. In FIG. 9, the pitch angle between the center of each land 3 and the center of adjoining twisted grooves 2 is represented as 360°/(2×n), assuming the total number of twisted grooves is n. The center position of No. i twisted groove 2 is represented as, $\theta_i = \gamma_{i-1} + 360°/(2 \times n)$, or $\theta_i = \gamma_i - 360°/(2 \times n)$, setting the center positions of lands 3 adjoining to the twisted grooves 2 as $\gamma_{i-1}$ and $\gamma_i$.

Thus, by knowing the center positions of lands 3 and the number of twisted grooves 2, the center positions of twisted grooves are obtained.

Figure 10:
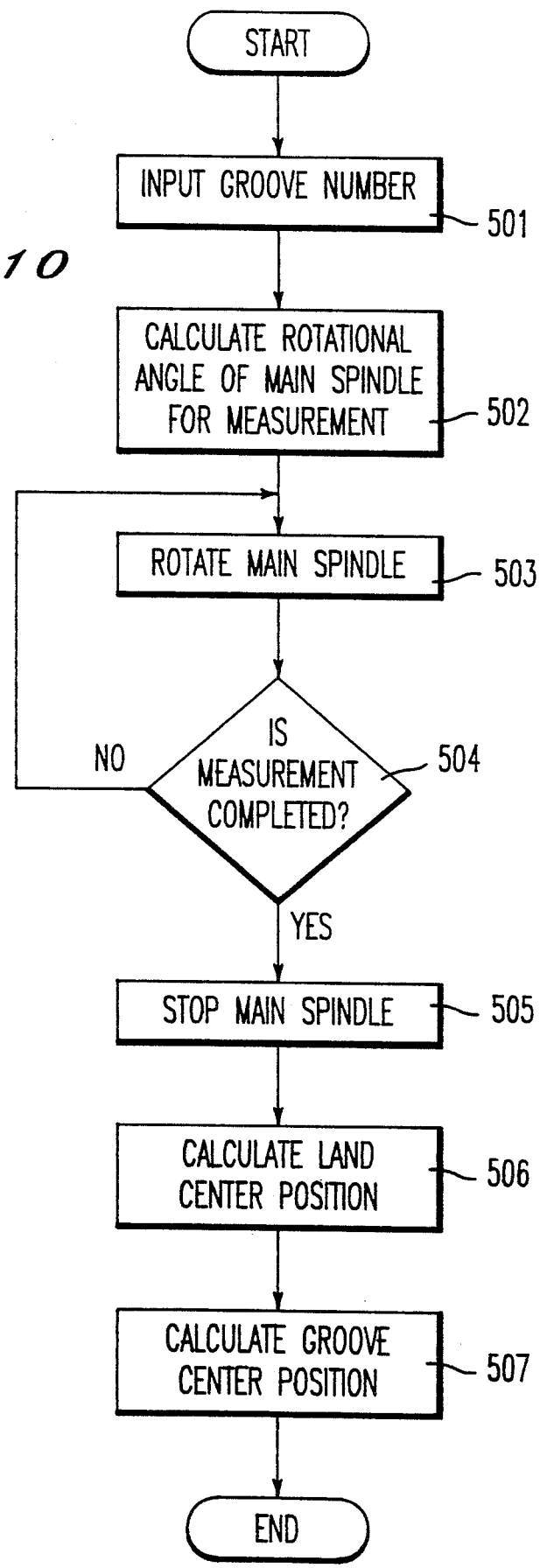
FIG. 10 is a flow chart showing a measuring procedure of the center positions of twisted grooves.

Next, the procedure to obtain the center position of the ith twisted groove 2, at angle $\theta_i$, of the workpiece 1 is described in the operation of said constituents. FIG. 10 is the flow-chart showing said procedure. First, a groove number is input in step 501. In step 502 the groove number is used to calculate the rotational angle of the main spindle for measurement period p. In step 503 the main spindle is rotated. Step 504 determines whether the measurement is completed. If the measurement is not completed the process returns to the step of rotating the spindle. When the process is completed the main spindle is stopped in step 505, and the land and groove positions are calculated in steps 506 and 507, respectively.

Figure 11:
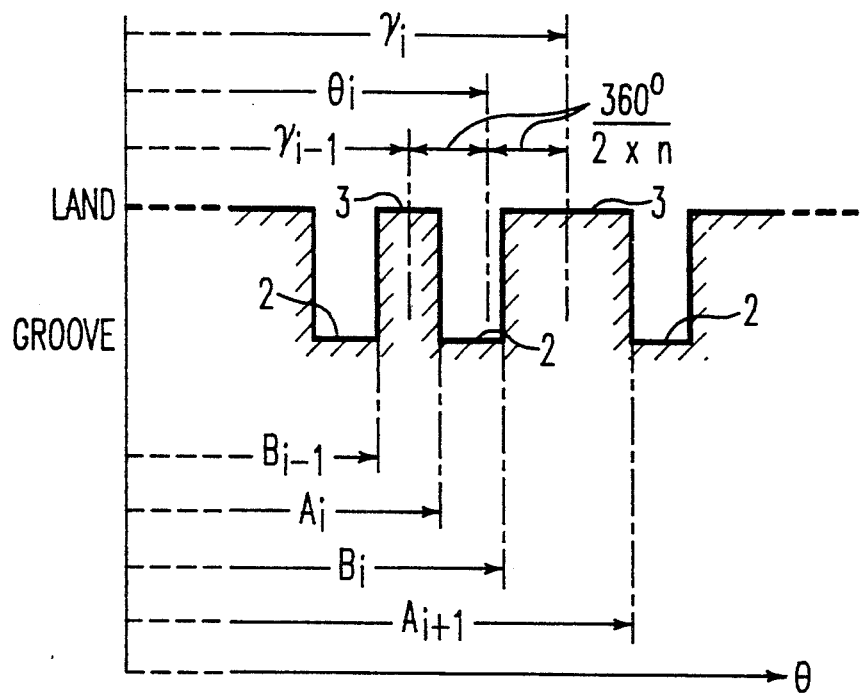
FIG. 11 is an explanatory view expanding linearly a circumferential part of the sections rectangular to the axis of said workpiece including the detecting position of a non-contact sensor.

FIG. 11 is the explanatory view showing the surface contour along the line VI—VI of FIG. 8, which corresponds to position of detector 7, which is also along line VI—VI of FIG. 8. FIG. 11 shows the angles of the lands and grooves, $\alpha_i, \theta_i$, and the linear spacings $A_i$ and $B_i$, between them, which correspond to the spacings between the lands and grooves shown along line VI—VI in FIG. 8.

Figure 12:
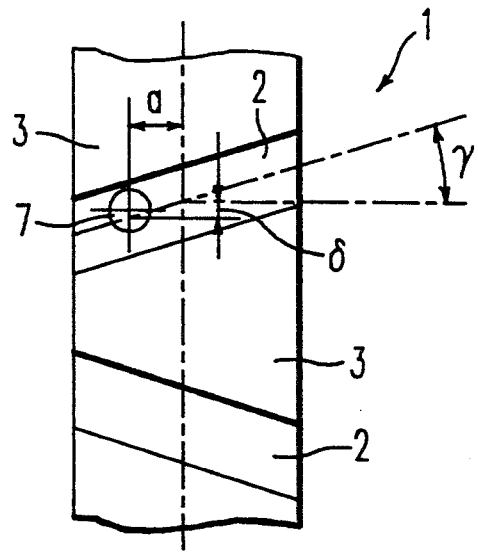
FIG. 12 is a schematic view of a conventional method of measuring groove positions of twisted grooves.

FIG. 12 shows how the offset of the center position 7 from the center line by a distance a creates an error $\delta$ due to the angular tilt of groove 2 at angle $\alpha$.

Figure 13:
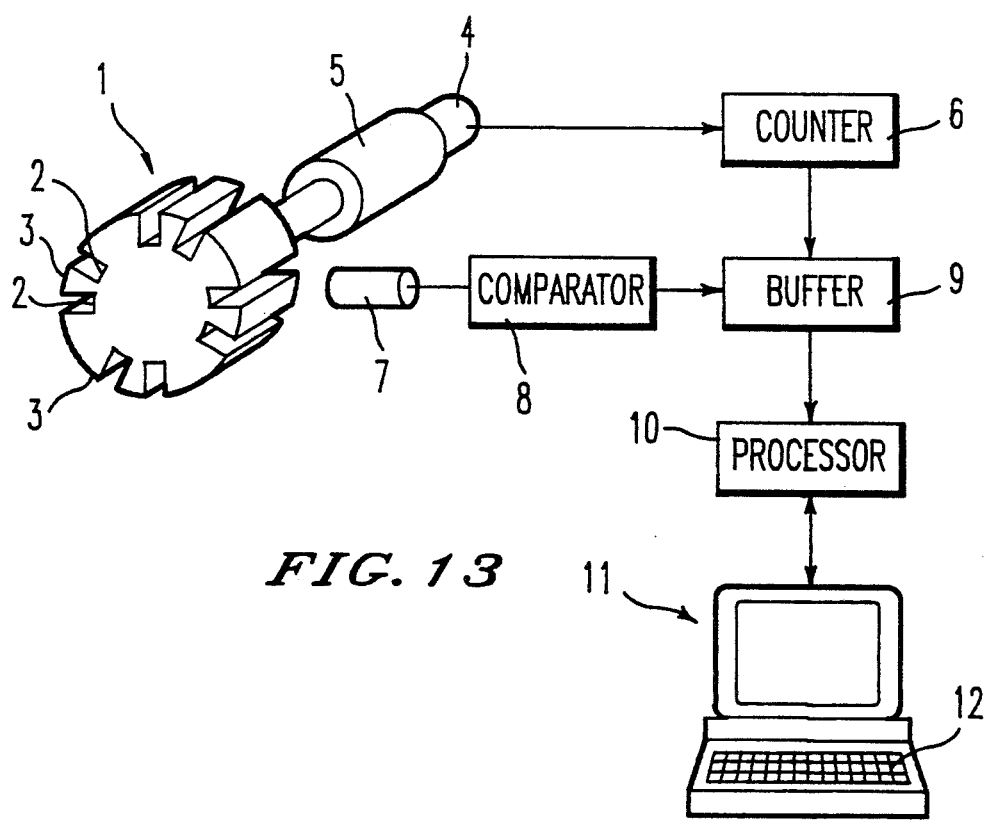
FIG. 13 is an outlined block diagram of measuring apparatus according to a third embodiment of the present invention.

FIG. 13 shows a system in which, through key-board 12 on the personal computer 11, the total number, n, of the twisted grooves 2 provided on the whole circumference of the workpiece 1 is input to the calculation processing unit 10 (step 501). Next, the calculation processing unit 10 calculate a rotational angle of main spindle for measurement required to measure the center positions of the twisted grooves 2 (step 502). Here, the value of $\theta_s$ is the pitch angle between the twisted grooves 2 which are equal in the direction of twist and in the nearest distance, and $\theta_s$ is computed from the equation, $\theta_s=(360°/n)\times 2$, through the calculation processing unit 10. Next, the main shaft and the workpiece 1 are rotated by driving the motor 5 shown in FIG. 6 (step 503). Comparing the rotational angle of main spindle $\theta$ to said rotational angle of main spindle for measurement $\theta_s$, its measurement is continued during the time having $\theta \leq \theta_s$, and the main spindle, is stopped (step 505) after judging the termination of measurement at $\theta > \theta_s$ (step 504). Next, the calculation processing unit 10 computes the center position of No.i land 3, $\gamma_i$, from an edge position $B_i$ which is located in the boundary between No.i twisted groove 2 and land 3, and an edge position $A_{i+1}$ which is located in the boundary between No.i land 3 and No.i+1 twisted groove 2 shown in FIG. 11, using the equation, $\gamma_i=(B_i+A_{i+1})/2$, (step 506). Further, based on the center position of No.i land 3, $\gamma_i$, the calculation processing unit 10 calculate the center position of No.i twisted groove 2, $\theta_i$, using the equation, $\theta_i=\gamma_i-360°/(2\times n)$, (step 107), and after outputting it to the personal computer 11, the operation is terminated.

Furthermore, there can be another processing method using the equation calculating the center position of No.i twisted groove 2, $\theta_i=\gamma_{i-1}+360°/(2\times n)$, after processing from the equation calculating the center position of No.i−1 land 3, $\gamma_{i-1}=(B_{i-1}+A_i)/2$, instead of using the center position of No.i land 3, $\gamma_i$, shown in FIG. 11.

This invention is not restricted to the details of above described embodiment. For example, as shown in FIG. 9 and FIG. 11 the center position of No.i twisted groove 2, $\theta_i$, can be represented by $(\gamma_{i-1}+\gamma_i)/2$, that is, averaging the center position of No.i−1 land 3, $\gamma_{i-1}$, and the center position of No.i land 3, $\gamma_i$. Therefore, a processing method, processing at first in the step 506 shown in FIG. 10 the center position of No.i−1 land 3, $\gamma_{i-1}$ $(=(B_{i-1}+A_i)/2)$, and the center position of No.i land 3, $\gamma_i(=B_i+A_{i+1})/2)$ through the calculation processing unit 10, next, processing in the step 507 the center position of No.i twisted groove 2, $\theta_i$, using the equation, $\theta_i=(\gamma_{i-1}+\gamma_i)/2$ through the calculation processing unit 10, can be used.

In said workpiece, the center positions of lands formed in between twisted grooves having an equal angle of twist and an inverse direction to adjoining grooves have following excellent effects: Measuring errors are not produced regardless of the setting errors of said non-contact sensor, and the center positions of twisted grooves are measured accurately without skills. Further, by eliminating skills to set said non-contact sensor, this leads to additional excellent merits that its total measuring time can be shortened.

THIRD EMBODIMENT

Figure 14A:
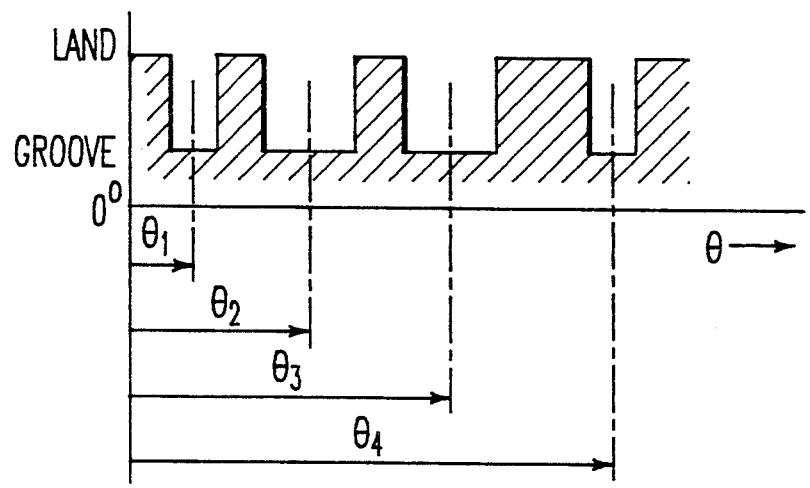
FIGS. 14(a) and 14(b) are diagrams illustrating the measured data and the set data respectively.

FIG. 14(a) illustrates the measured center positions ($\theta_1 \ldots \theta_4$) of the grooves 2 on the actual workpiece 1 which are obtained by calculation.

Figure 14B:
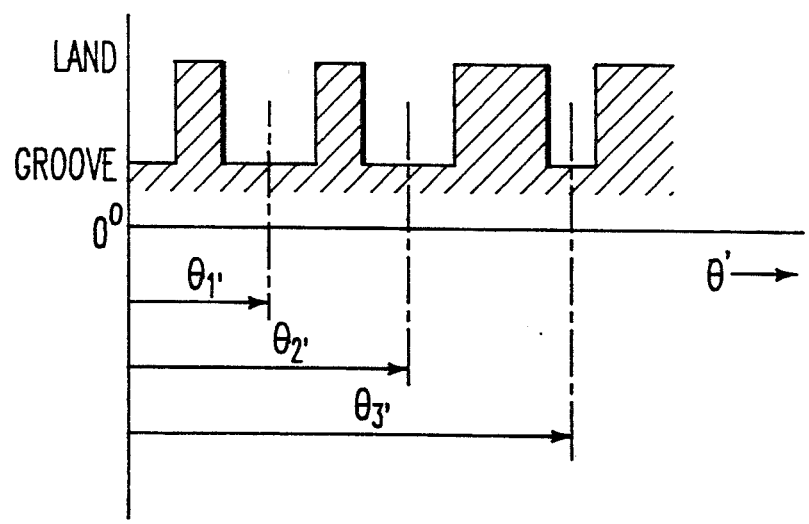

FIG. 14(b) illustrates the set data indicating theoretical center positions of the grooves 2 on the workpiece 1 which is specified in a blue print as angular information $\theta'$ from the predetermined reference position.

The set data are inputted into the memory of the calculation processing unit 10 through the key board 12 of the personal computer 11. More specifically, the data of the edge positions of each groove 2 on the workpiece 1 are inputted into, and calculated in the above described calculation processing unit 10 to find the center position.

And in the apparatus of this embodiment, the first set data indicating theoretical center position of the groove is made agree with one of the measured center positions of the grooves, and the accumulated value of the deviations is obtained; that is the accumulated value of pitch errors between the corresponding set and measured data of the other center positions. Then the minimum value is derived from the accumulated values of the deviations obtained in the above described manner for the measured center positions of the all grooves, and divided by the number of the grooves to find the mean value. Thus the center position of each groove is calculated by using this mean value.

Figure 15:
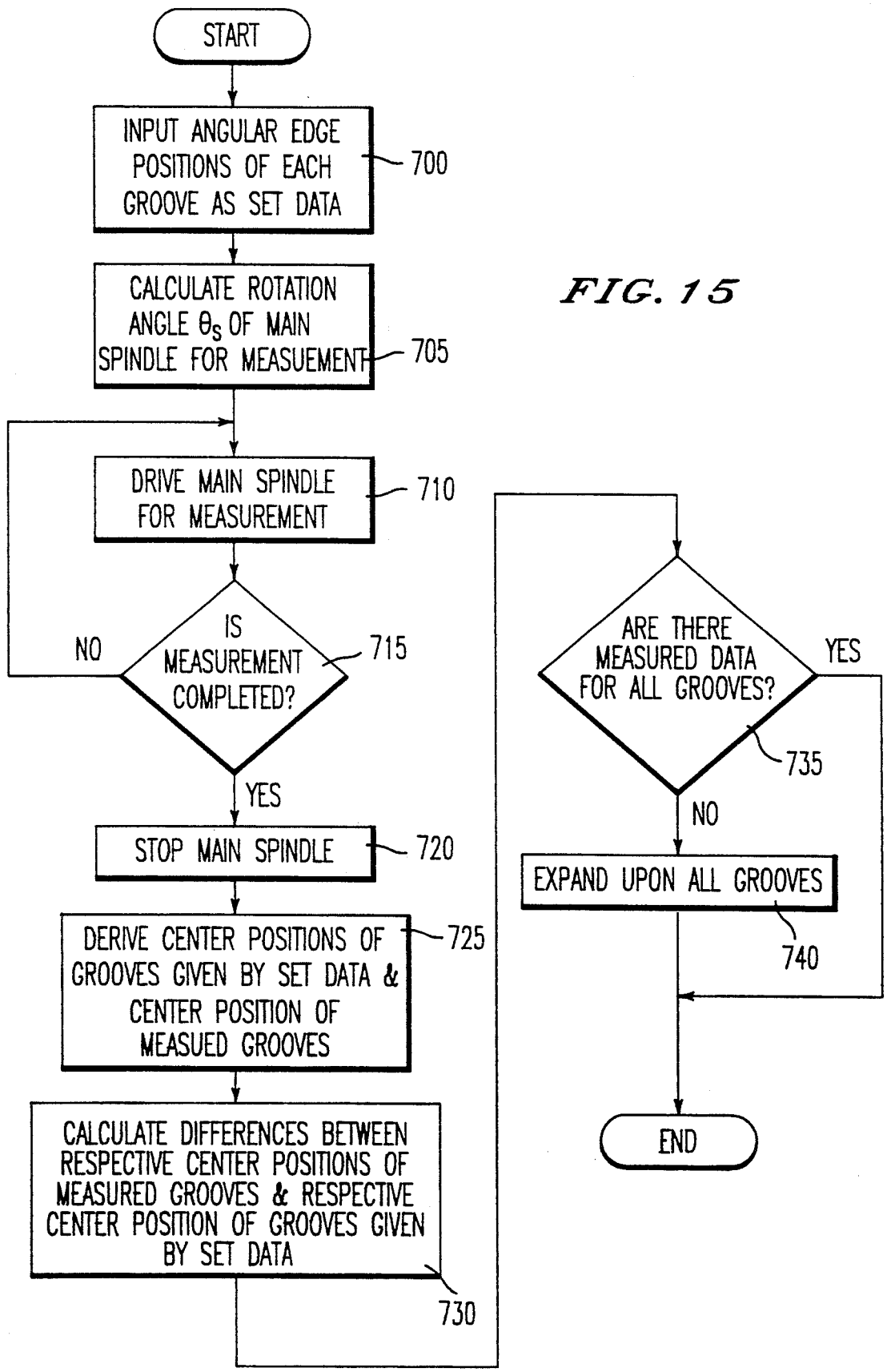
FIG. 15 is a flow chart of the operations performed during use of the apparatus of FIG. 13.

The calculation process of the apparatus in this embodiment will now be explained in accordance with the flow chart as shown in FIG. 15.

First in step 600, the edge positions of each groove 2 formed on the workpiece 1 are inputted as angular data, and memorized as set data. Next in step 605, the rotation angle $\theta_s$ is calculated for the main spindle for measurement which is mounted with the workpiece 1. In this calculation, the angle $\theta_s$ becomes 360° because it is needed to obtain deviations of the center positions of all grooves 2. In steps 610, 615 and 620, the main spindle for measurement is driven to rotate, the measured data of each groove is memorized, and the main spindle is stopped after the completion of the measurement is judged. The completion of the measurement is judged in accordance with the rotation angle of the main spindle for measurement $\geq \theta_s$.

In step 625, the theoretical center positions and theoretical groove breadth of each groove and calculated from the above set data of the edge positions as well as the center position and the groove breadth of each measured groove. Next in step 630, the set data of the groove derived from step 625 is made agree with the measured data of the groove by using respective center positions or groove breadths. To be concrete, the combination is found in which the accumulated value of the deviations of the center positions of each corresponding grooves becomes minimum, and the difference of the breadths of each corresponding grooves also becomes minimum.

Figure 16A:
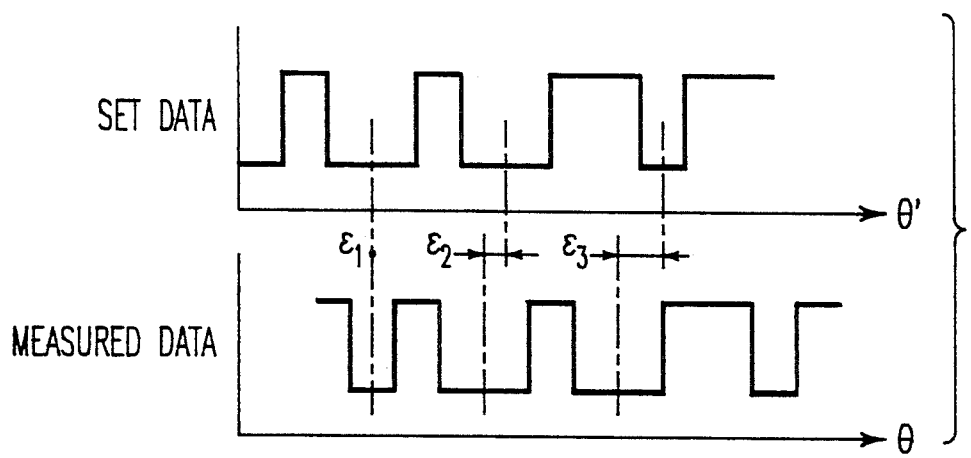
FIGS. 16(a)-16(c) are diagrams explaining data processing carried out in the flow chart of FIG. 4.

For the equally spaced grooves as shown in FIG. 16(a), the center position of one of the measured grooves is made agree with the theoretical center position of a predetermined groove calculated from the set data. The deviation or the pitch error $\epsilon_1$ of the center positions of the respective corresponding grooves are calculated. Theoretically $\epsilon_1$ is calculated from the following formula;

$$\epsilon_1 = 0$$
$$\epsilon_1 = (\theta_1 - \theta_1) - P(i - 1)/n$$
$$(i = 2, 3, \ldots n)$$

where n: number of the grooves (the same hereafter),
p: pulse counted value during one rotation of the encoder, or 360°. (the same hereafter).

And the accumulated value $\epsilon$ of the deviation $\epsilon_i$ is calculated as follows;

$$\epsilon_1 = \sum_{i=1}^{n} |\epsilon_i|$$

Figure 16B:
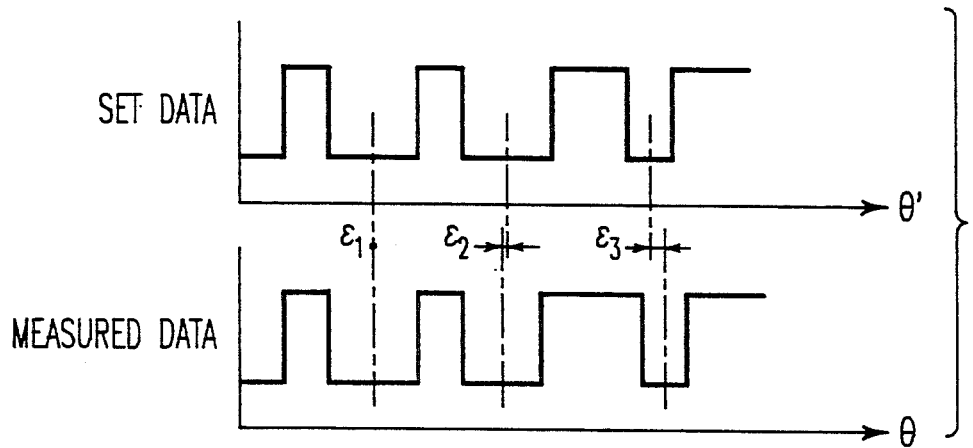
Figure 16C:
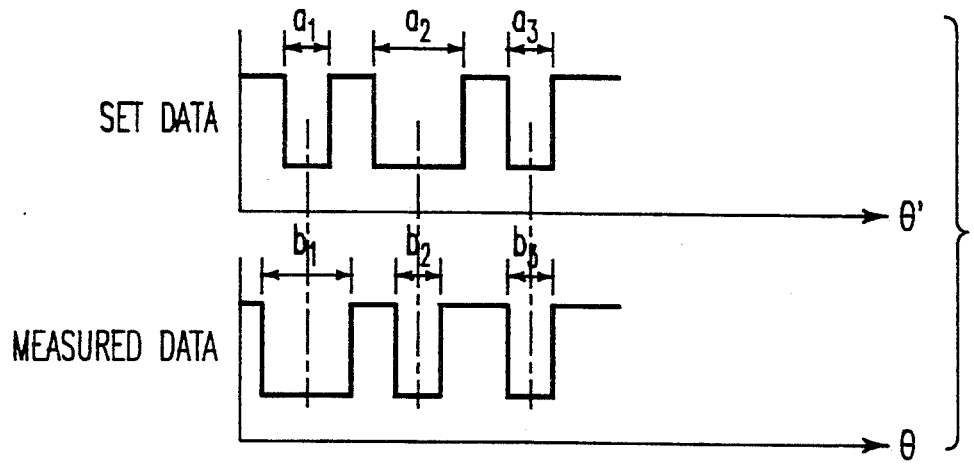

Next, as shown in FIG. 16(b), the measured data indicating the positions of grooves are shifted so that different measured groove corresponds to said predetermined groove given by the set data. Then the center position of the measured groove is made agree with the set data center position of the predetermined groove, and the accumulated value of the deviations is found as described above. The above process is repeated for all grooves of the measured data so that the accumulated value of deviations is calculated for each groove, and the minimum value is selected from the respective accumulated values of the deviations. Here, even when the accumulated value of the deviations is minimum, the groove breadths of respective measured grooves do not necessarily agree with theoretical breadths of grooves given by the set data, as shown in FIG. 16(c). In this case, a combination needs to be found in which the accumulated value of the deviation becomes small and difference of each groove breadth becomes smaller than a predetermined value. Next in step 635, the mean value $\epsilon$ is derived from dividing the minimum value of the accumulated deviations by the number of the grooves as follows;

$$\overline{\epsilon} = \sum_{i=1}^{n} |\epsilon_i|/n$$

In step 640, the center position of each groove is calculated using the mean value e derived from step 635. If the center position of the predetermined groove given by the set data is $\theta_1'$ the center position $\theta_1'$ of the groove to be calculated is $\theta_1' = \theta_1 + \overline{\epsilon}$. The center positions $\theta_1'$ of the other grooves are calculated as follows;

$$\theta_1' = \theta_1' + P(i-1)/n$$
$$= \theta_1 + \overline{\epsilon} + P(i-1)/n$$
$$(i = 1, 2, 3, \ldots, n)$$

FIG. 17 shows a concrete example of the above described process for calculating the center position of the groove.

Figure 17A:
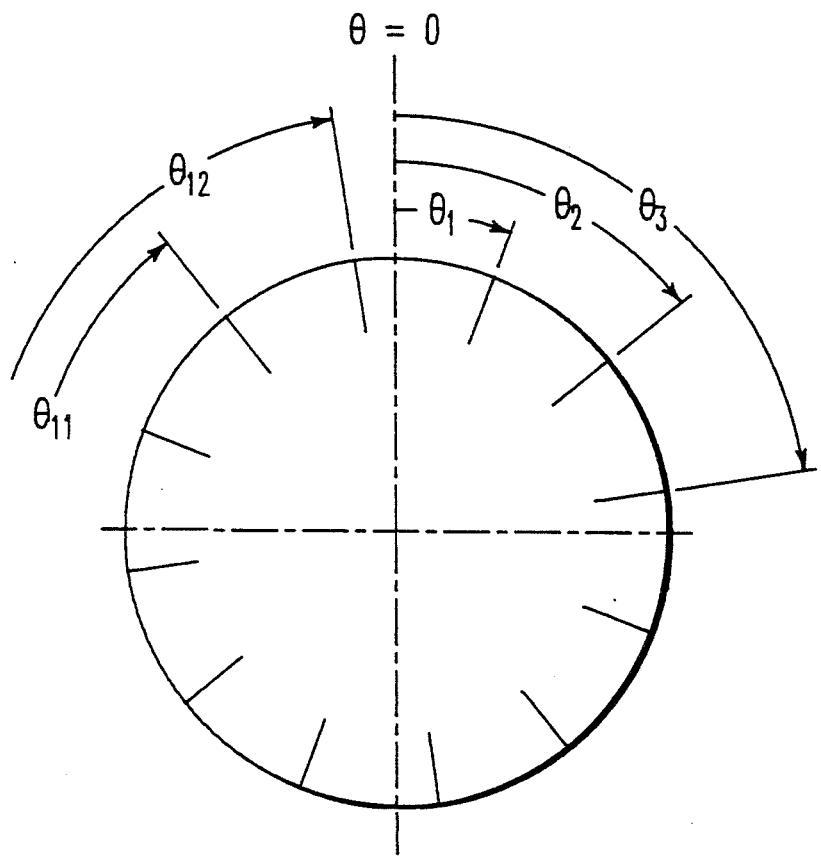

FIG. 17(a) shows the center positions $\theta_i$ of the grooves, where $\theta_i$ is the position of 20° with respect to the reference position $\theta = 0$, and $\theta_2, \theta_3, \ldots, \theta_{12}$ are positions equally spaced at an interval of 30° from $\theta_1$.

FIG. 17(b) is a data table which contains the measured data of the groove center positions and the deviations (pitch errors) between the measured data and the set data $\theta_i$ of the groove center positions, and this is the combination wherein the above accumulated value of the deviations becomes minimum. The mean value $\epsilon$ of the accumulated value of the deviations is as follows;

$$\overline{\epsilon} = \sum_{i=1}^{12} |\epsilon_1|/12 = 15/12 = 1.25$$

and the square sum of mean values (pitch errors) becomes 223.

FIG. 17(c) is the data table which contains the modified measured data of the groove center positions and the deviations data between this modified measured data and the measured data of the groove center positions. Here, the modified measured data of the groove center position are calculated in $$\theta_1' = \theta_1 + \overline{\epsilon} \text{ and } \theta_1' = \theta_1 + \overline{\epsilon} + P(i-1)/n$$

in accordance with the above modification process. And the square sum of the deviation becomes 106.75.

As described above, when $\theta_1'$ is calculated using the mean value $\epsilon$ deribed from the minimum value of the accumulated deviations, and the other groove center positions are calculated in accordance with $\theta_1' = \theta_1 + \theta$, then the square sum of the deviations becomes minimum.

Consequently, the deviation of the grinding allowances can be minimum when the grooves are indexed using the modified groove center positions during grinding operation.

Although a combination is found to minimize the accumulated deviations in the above embodiment, such process can be omitted in case of measuring equal split grooves. In such a case, only one accumulated deviation is calculated for determining the means value $\overline{\epsilon}$.

While the above embodiment has been described on the equally spaced grooves, it should also be understood that the modification process of the center position described above is applicable to the unequally speced grooves, because in the latter case the pitch errors can be derived from previously inputting the pitches of the groove centers.

In addition, the above embodiment has been explained on the state of measuring the groove positions formed on the outer periphery of the workpiece as a body of revolution, but the workpiece is not limited to the body of revolution, and may be a linear body. In the latter case, a linear encoder or the like is used as a position sensor for measuring the groove positions formed on such a workpiece.

FOURTH EMBODIMENT

The fundamental measuring method of the fourth embodiment is substantially identical to that of the first embodiment.

FIGS. 18(a)-18(d) illustrates developments of the periodic patterns of the grooves 2 and the lands 3 alternately formed on the workpiece 1.

Figure 18A:
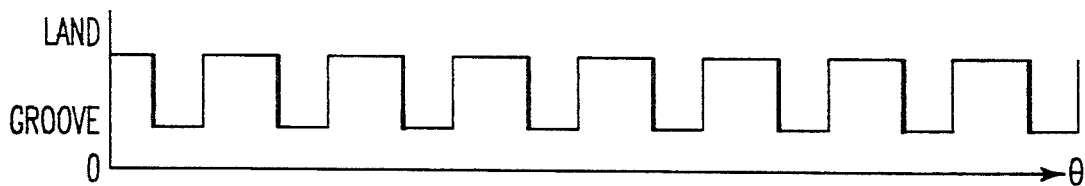
FIGS. 18(a)-18(d) are developments respectively illustrating the periodic patterns of the grooves 2 and the lands 3 formed on the workpiece 1.

In FIG. 18(a), there is shown a pattern of the grooves 2 all of which have the equal breadth and equal pitch of the center position, and from measuring the pitch, breadth and the like of the one groove it is possible to derive the positions of the remaining ones.

Figure 18B:
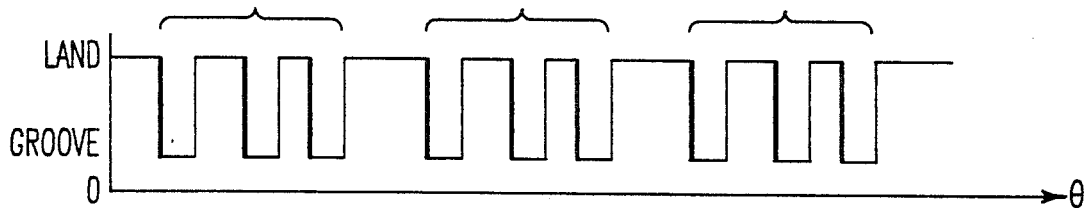

In FIG. 18(b), the pitches of the center positions of all the grooves 2 are not equal, but the pitches of the center positions in a group comprising three grooves are in a periodic pattern. From measuring the one group of the grooves, it is possible to derive the positions of all the remaining ones. In this case the number of the grooves is not limited to three.

Figure 18C:
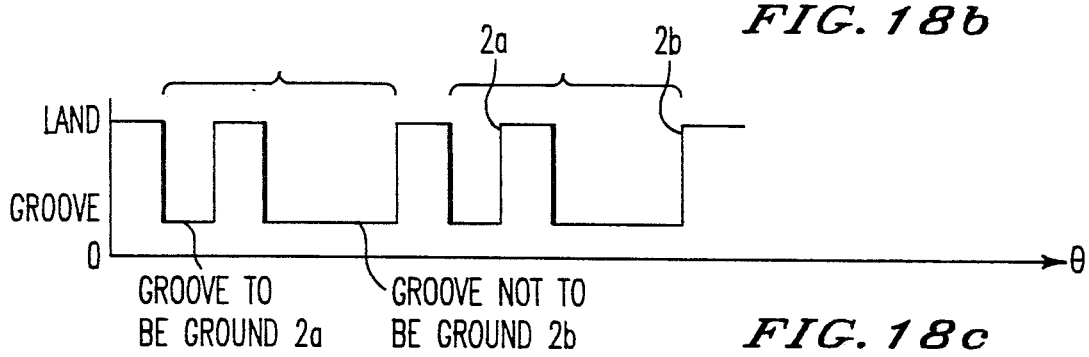

Further, in FIG. 18(c), there is a pattern of the grooves where two kinds of the grooves 2a, and 2b with the different breadths are alternately formed. From measuring the pitches of the center positions of the two kinds of the grooves 2a and 2b, it is possible to judge the differences among the positions and those among the breadths of the remaining grooves. Consequently it is possible to find one of such grooves, for example grooves 2a which needs to be ground.

Figure 18D:
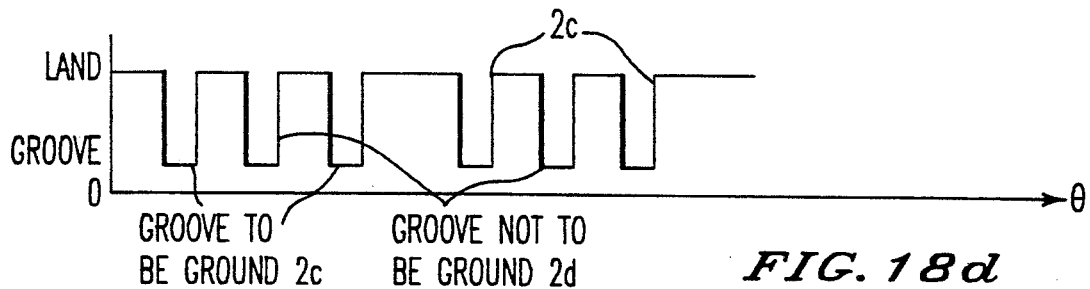

Still further, in FIG. 18(d), there are the grooves 2c which need grinding and the grooves 2d which need no grinding, and they have both the same breadth but the different pitches of the center positions of respective groove 2c and 2d. For this pattern, it is possible to judge the difference of the grooves acocrding to the difference of the pitches. That is, from measuring the one group of three grooves, it is possible to derive the positions of all the remaining grooves, and it is also possible to judge whether they are the grooves 2c to be ground or the grooves 2d not to be ground.

Figure 19:
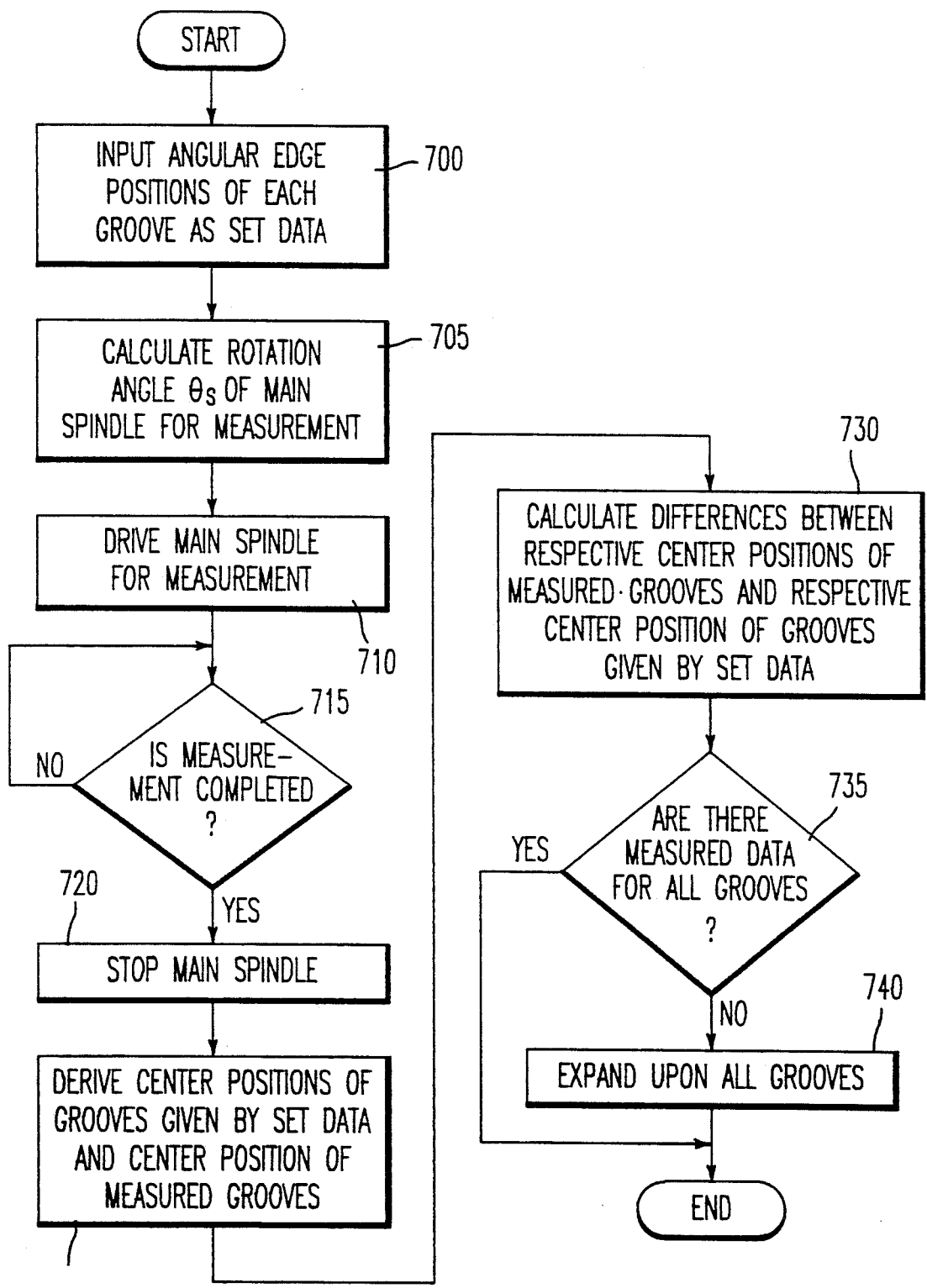
FIG. 19 is a flow chart illustrating a forth embodiment of the present invention.

The above measuring process of each groove position in the apparatus of this embodiment will now be explained in accordance with the flow chart as shown in FIG. 19.

First in step 700, regarding the minimum unit of the periodic pattern of the grooves 2 and the lands 3 alternately formed on the workpiece 1, the edge positions of each groove 2 are inputted as angular data from the predetermined reference position, and memorized as set data. Next in step 705, the rotation angle $\theta_s$ is calculated for the main spindle for measurement which is mounted with the workpiece 1. The angle $\theta_s$ can be derived from $\theta_s = 360°$/number of the grooves for the equally spaced grooves, or derived from $\theta_s = 360°$/number of the periodic patterns for the grooves 2 and the lands 3 formed with a regularly periodic pattern. In steps 710, 715 and 720, the main spindle for measurement is driven to rotate, the measured data of each groove is memorized, and the main spindle is stopped after the completion of the measurement is judged. The completion of the measurement is judged in accordance with the rotation angle of the main spindle for measurement $> \theta_s$. In step 725, the theoretical center position and breadth of each groove are calculated from the above set data of the edge positions. Also the center position and the breadth of each measured groove on the workpiece 1 within the angle $\theta_s$ are calculated from the above measurement. Next in step 730, differences between respective center positions of the measured grooves within the angle $\theta_s$ and respective center positions of the grooves given by the set data within the angle $\theta_s$. Namely, the center positions of other grooves outside the angle $\theta_s$ are calculated by adding respective differences obtained at step 730 to their theoretical center positions calculated from the expanded data. In step 735, it is judged whether the groove data as the set data corresponding to all the grooves on the workpiece 1 are inputted or not. If the set data are not inputted for all the grooves, the set data are expanded upon all the grooves in step 740, because those data has been inputted corresponding only to the grooves in the minimum unit of the periodic pattern of the grooves 2 and the lands 3 except for the unequally spaced grooves. Thus in accordance with the expanded data of all the grooves, the positions of other grooves are derived. If in step 735, step data exist for all grooves, the subroutine ends.

As explained above, in the apparatus for measuring groove positions of a workpiece of this embodiment, the groove data in the minimum unit of the periodic pattern with which the grooves 2 and lands 3 alternately formed on the outer periphery of the workpiece 1 are previously inputted as a set data. During measuring the grooves on the workpiece 1, the main spindle for measurement is rotated by the angular amount corresponding to the minimum unit of the periodic pattern. When the groove data are expanded upon all the groove data, it is possible to find the differences of the positions and breadths of the remaining grooves.

In addition, the above embodiment has been explained on the state of measuring the groove positions formed on the outer periphery of the workpiece as a body of revolution, but the workpiece is not limited to the body of revolution, and may be a linear body. In the latter case, a linear encoder or the like is used as a position sensor for measuring the groove positions formed on such a workpiece.

Although the invention has been described in its preferred form with a certain degree of particularity, it is understood that the present disclosure of the preferred form has been changed in the details of construction and the combination and arrangement of parts may be resorted to without departing from the spirit and the scope of the invention hereinafter claimed.

What is claimed is:

1. An apparatus for measuring groove positions of a workpiece comprising:
   a groove sensor for detecting grooves formed on the workpiece;
   a position sensor for detecting a position of the workpiece with respect to a predetermined reference position;
   a measuring cycle memory means for storing several predetermined measuring cycles;
   a data input and storage means for inputting and storing groove data indicating groove shape patterns such as spiral groove, equal split groove and unequal split groove;
   a measuring cycle selection and control means for selecting a specific measurement cycle from said measuring cycle memory means based on stored groove data and for controlling said workpiece by moving said workpiece by a predetermined amount in accordance with the selected specific measurement cycle, said measuring cycle selection and control means coupled to the groove sensor, position sensor, measuring cycle memory means and data input and storage means;
   a determination means coupled to the measuring cycle selection and control means for determining the center positions of the grooves based upon an output signal from said groove sensor, the stored groove pattern data and said position of the workpiece; and
   a data output means coupled to the measuring cycle selection and control means, for outputting the results of the determinations.

2. The apparatus as claimed in claim 1, wherein the determination means comprises a counter, a comparator, a buffer, a CPU, a memory, and an interface which are connected to one another to form a data processing unit.

3. The apparatus as claimed in claim 1, wherein the groove sensor is a non-contact sensor.

4. An apparatus for measuring groove positions of a workpiece formed with twisted grooves which have an equal twist angle but change their twist direction alternatively, comprising:
   a groove sensor for detecting the existence of grooves formed on the workpiece;
   a position sensor for detecting a position of the workpiece with respect to a predetermined standard position;
   a counter for counting pulses outputted from said position sensor;

wherein positions of the grooves are detected based upon outputs of the counter and the groove sensor; and a means for computing the center positions of lands between adjoining twisted grooves through an arithmetic operation, based on the counting values of said counter at times when said groove sensor detects both edges of a land, and, based on the center positions of said lands, computing the center positions of the twisted grooves, said means for computing coupled to the sensors and the counter.

5. The apparatus as claimed in claim 4, wherein the means for computing comprises, a comparator, a buffer, a CPU, a memory, and an interface which are connected to one another to form a data processing unit.

6. The apparatus as claimed in claim 4, wherein the groove sensor is a non-contact sensor.

7. An apparatus for measuring groove positions of a workpiece comprising:

a groove sensor for detecting the position and existence of grooves formed on the workpiece which outputs a detection signal;

a position sensor for detecting a position of the workpiece with respect to a predetermined standard position;

a counter for counting pulses outputted from said position sensor;

wherein positions of the grooves are detected based upon outputs of the counter and the groove sensor;

a calculating means coupled to the sensors and the counter, for calculating the center positions of grooves with respect to a predetermined reference position in accordance with the counted values of the counter at times when the detection signal of said groove sensor changes;

a measured data memory means coupled to the calculating means, for memorizing said calculated values indicating the center positions as measured data;

a set data memory means coupled to the calculating means for memorizing the theoretical center position of each groove on the workpiece previously inputted as set data;

a deviation detecting means coupled to the calculating means for accumulating each deviation between the measured data and the corresponded set data of the center position of each groove; and a center position determining means, coupled to the calculating means, for determining the center position of each groove using the mean value of the deviation derived by dividing said accumulated deviation by the number of the grooves.

8. The apparatus as claimed in claim 7, wherein the calculating means comprises, a comparator, a buffer, a CPU, a memory, and an interface which are connected to one another to form a data processing unit.

9. The apparatus as claimed in claim 7, wherein the groove sensor is a non-contact sensor.

10. An apparatus for measuring groove positions of a workpiece comprising:

a groove sensor for detecting the position and existence of grooves formed on the workpiece which outputs a detection signal corresponding to a structure of a surface of the workpiece;

a position sensor for detecting a position of the workpiece with respect to a predetermined standard position;

a counter for counting pulses outputted from said position sensor;

a calculating means coupled to the sensors and the counter, for calculating the groove center positions of grooves with respect to a predetermined reference position in accordance with the counted values of the counter at times when the detection signal of said groove sensor changes;

a measured data memory means, coupled to the calculating means, for memorizing the calculated values indicating center positions of the grooves as measured data;

a set data memory means, coupled to the calculating means, for memorizing the groove data regarding at least the minimum unit of a periodic pattern of groove data, the groove data indicating theoretical positions of the grooves formed on the workpiece;

a workpiece rotating means coupled to the calculating means, for rotating the workpiece by an angular amount corresponding to the minimum unit of the periodic pattern; and a groove positions finding means coupled to the calculating means for finding the positions of the remaining grooves by using said set data and the measured data and the minimum unit of said period pattern.

11. The apparatus as claimed in claim 10, wherein the calculating means comprises, a comparator, a buffer, a CPU, a memory, and an interface which are connected to one another to form a data processing unit.

12. The apparatus as claimed in claim 10, wherein the groove sensor is a non-contact sensor.

* * * * *

UNITED STATES PATENT AND TRADEMARK OFFICE
CERTIFICATE OF CORRECTION

PATENT NO. : 5,155,694

DATED : October 13, 1992

INVENTOR(S) : TAKAO YONEDA ET AL

It is certified that error appears in the above-identified patent and that said Letters Patent is hereby corrected as shown below:

Column 11, Line 36, please delete " $\theta_1' = \theta_1 + \bar{8}$ " and insert therefor -- $\theta_1' = \theta_1 + \bar{\varepsilon}$ --.

Column 11, Line 49, Please change " $\theta_i$ " to -- $\theta_1$ --.

Column 11, Line 57, Please change " $\varepsilon$ " to -- $\bar{\varepsilon}$ --.

In Figure 19, please add -- 725 -- to STEP (DERIVE CENTER POSITIONS OF GROOVES GIVEN BY SET DATA AND CENTER POSITION OF MEASURED GROOVES).

Signed and Sealed this

Seventh Day of December, 1993

*Attest:*

*Attesting Officer*

BRUCE LEHMAN

*Commissioner of Patents and Trademarks*